United States Patent [19]
Spangler, Jr.

[11] Patent Number: 4,896,435
[45] Date of Patent: Jan. 30, 1990

[54] REPLACEABLE WEAR PARTS FOR CENTRIFUGAL PELLET DRYERS

[75] Inventor: Melvin B. Spangler, Jr., Clifton Forge, Va.

[73] Assignee: Gala Industries Inc., Eagle Rock, Va.

[21] Appl. No.: 192,127

[22] Filed: May 10, 1988

[51] Int. Cl.⁴ .............................................. F26B 17/30
[52] U.S. Cl. .......................................... 34/58; 210/277
[58] Field of Search ...................... 34/58, 59; 210/369, 210/374, 377, 415

[56] References Cited

U.S. PATENT DOCUMENTS

| | | |
|---|---|---|
| 702,127 | 6/1902 | Churchill . |
| 2,727,631 | 12/1955 | Pate ................................ 210/377 X |
| 3,360,865 | 1/1968 | Galle . |
| 3,385,443 | 5/1968 | Cuza ................................ 210/369 X |
| 3,458,045 | 7/1969 | Dudley ............................ 210/415 X |
| 4,476,019 | 10/1984 | Nowisch . |
| 4,497,122 | 2/1985 | Nelson . |

Primary Examiner—Henry A. Bennet
Assistant Examiner—J. Sollecito
Attorney, Agent, or Firm—Fleit, Jacobson, Cohn, Price, Holman & Stern

[57] ABSTRACT

Improvements in centrifugal pellet dryers including replacement parts for those areas of a centrifugal pellet dryer that are most subject to wear during normal use when drying pellets. The feed chute, base section and top section with pellet discharge chute are replaceable thereby avoiding the necessity of providing a completely new housing structure or a completely new pellet dryer when the dryer has become worn during normal use. The replaceable parts are substantially duplicative of the parts which they replace and are secured in place by conventional fastening and sealing arrangements.

2 Claims, 1 Drawing Sheet

REPLACEABLE WEAR PARTS FOR CENTRIFUGAL PELLET DRYERS

BACKGROUND OF THE INVENTION

1. Field of the Invention

The present invention generally relates to improvements in centrifugal pellet dryers and more specifically to replacement parts for those areas of a centrifugal pellet dryer that are most subject to wear during normal use when drying pellets. The feed chute, base section and top section with pellet discharge chute are replaceable thereby avoiding the necessity of providing a completely new housing structure or a completely new pellet dryer when the dryer has become worn during normal use. The replaceable parts are substantially duplicative of the parts which they replace and are secured in place by conventional fastening and sealing arrangements.

2. Information Disclosure Statement

Centrifugal pellet dryers have been used for a number of years in separating water from pellets which are supplied to the dryer from a pelletizer in the form of a slurry. The water and pellets are initially separated by a screen assembly in a feed chute and the pellets are elevated by a rotatable drum having spiral flights thereon with the elevated pellets being discharged through a discharge chute. The drum is driven by an electric motor or other power source and the drum has a plurality of projections in the form of spiral flight segments oriented between it and an inner screen housing so that pellets entering the lower end of the drum will be elevated. A feed chute is provided with an inclined screen bottom on which the slurry is dropped with the bottom being perforated or of screen structure for dewatering the pellets as they enter the lower end of the dryer. As the pellets migrate upwardly between the periphery of the drum and the inner housing, they are subjected to an air flow induced by a fan at the upper end of the dryer. Also, the pellets move radially and centrifugally from the upper end of the inner casing or housing into a pellet discharge chute so that relatively dry pellets are discharged from the dryer. This type of structure is disclosed in prior U.S. Pat. No. 3,458,045. During normal use of this type of pellet dryer, the feed chute including the base section and the top section and pellet discharge chute are subject to wear due to the abrasive action of the pellets moving along the surfaces. This is especially problematical when the pellets contain abrasive fillers such as fiberglass, talc, titanium dioxide and the like. When such pellets are used, the dryer experiences rapid wear or erosion of the parts that the pellets contact. The present solution to such wear is to replace the entire dryer housing or cut out the worn parts such as by using a cutting torch and welding in new components. As appreciated, this solution is expensive since it requires considerable time and, if a new housing is purchased, it is also quite expensive and, if the welding technique is used, considerable time is lost by having the dryer out of service. In fact, the cost to a customer may be quite excessive in downtime or purchase of a replacement housing. No other solutions to this problem exist.

SUMMARY OF THE INVENTION

An object of the present invention is to provide a cylindrical pellet dryer that incorporates replaceable wear parts that are secured in place by easily and quickly used fastener devices to enable replacement of worn components of a centrifugal pellet dryer at minimum cost and with minimum downtime of the dryer.

Another object of the invention is to provide replaceable wear parts for a centrifugal pellet dryer in which the replaceable parts include the feed chute at the lower end of the centrifugal pellet dryer, a replaceable base section at the lower end of the dryer, a replaceable top section and pellet discharge chute at the upper end of the pellet dryer.

A further object of the invention is to provide replaceable wear parts for a centrifugal pellet dryer in accordance with the preceding objects in which the feed chute includes two replaceable wear parts on each internal side of the feed chute where abrasion occurs which are attached by nuts and bolts, the base section being a separate assembly attached by nuts and bolts, the top section and pellet discharge chute being an entire separate assembly which is subject to wear and is attached by nuts and bolts whereby the improvements made in a centrifugal pellet dryer will enable abrasive pellets to be effectively dried while limiting the amount of downtime between repairs when replacement wear parts are stocked by a user in order to further decrease downtime since the replaceable parts will be immediately available.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
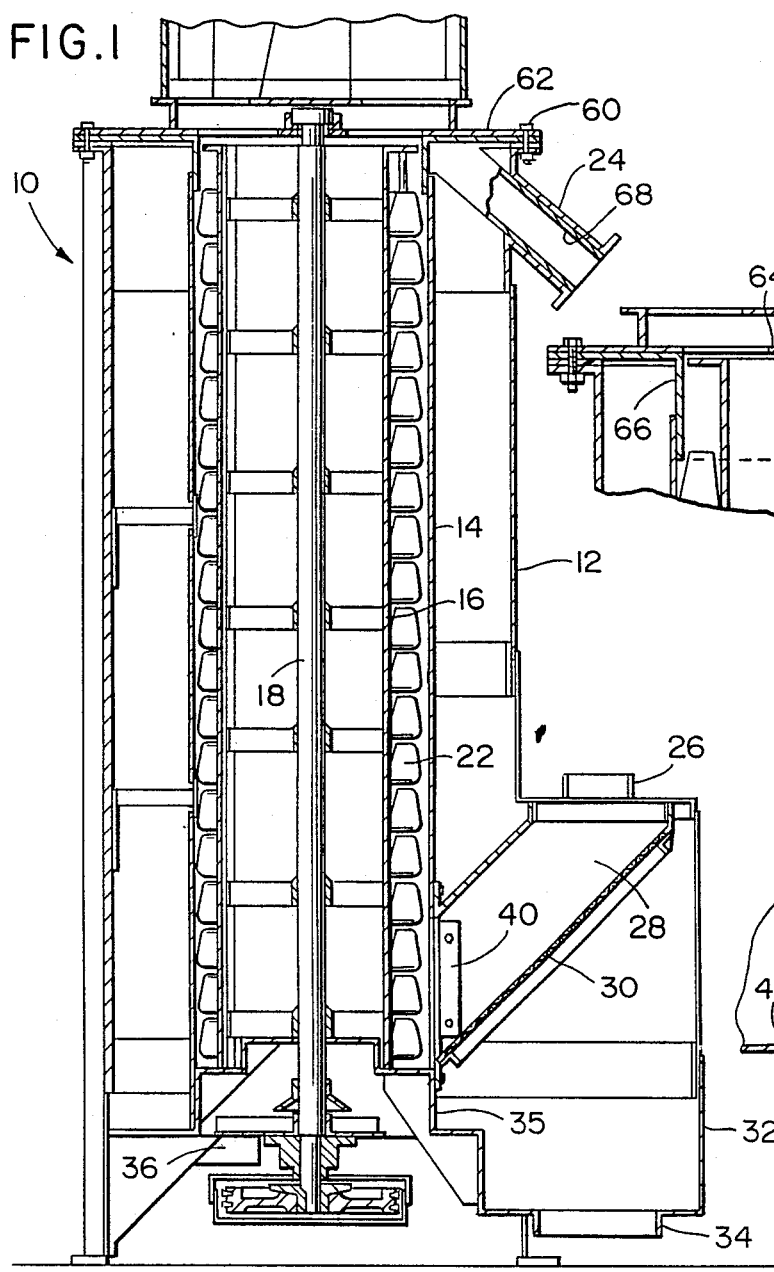
FIG. 1 is a vertical sectional view of a centrifugal pellet dryer incorporating the replaceable wear parts therein.
Figure 2:
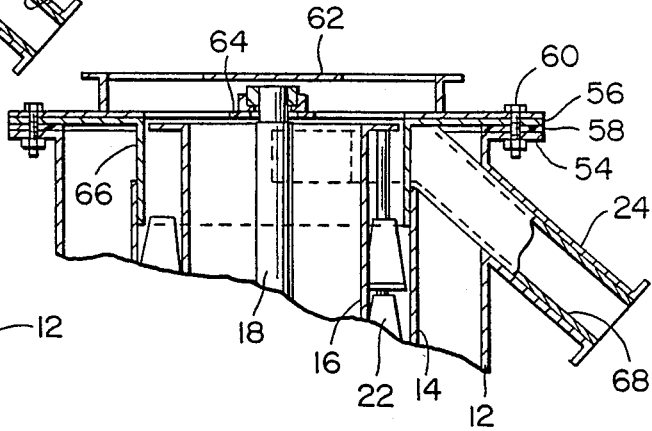
FIG. 2 is a fragmental detailed view of the top section and replaceable dry pellet discharge chute.

Referring now specifically to the drawings, the centrifugal pellet dryer incorporating the replaceable wear parts of the present invention is generally designated by reference numeral 10 and includes an outer housing 12 and an inner housing 14 spaced therefrom. Positioned in the inner housing 14 is a drum 16 supported by a shaft 18 driven by a motor at the lower end thereof with the space between the drum 16 and inner housing 14 including a plurality of spirally arranged blades or flights 22 fixed to the rotatable drum 16 to elevate pellets in the space between cylindrical inner housing 14 and the cylindrical drum 16. The space between the drum 16 and the inner housing 14 is communicated with a discharge chute 24 at the upper end of the housing 12 by which dried pellets may be discharged.

A water and pellet slurry inlet 26 is provided adjacent to the lower end of the housing 12 and the inlet is communicated with a feed chute 28 having an inclined perforated or screen bottom 30 so that water will be separated from the pellets with the water dropping downwardly into a discharge housing 32 and out through a discharge opening 34. The lower end of the shaft is supported by a bottom frame 36. The base section 35 provides a closure for the lower end of the space between the inner housing 14 and the drum 16 with the feed chute 28 communicating with the space between the drum and inner housing in a manner well known. The aforedescribed structure of the centrifugal pellet dryer is conventional and has been in commercial use for a number of years and is generally the structure disclosed in U.S. Pat. No. 3,458,045.

During normal operation of the dryer, pellets come into contact with stationary surfaces and also with movable surfaces and cause erosion or abrasion of these surfaces especially when the pellets have abrasive material incorporated therein such as fiberglass, talc, titanium dioxide and the like. Inasmuch as the components mentioned are integral with the housing structure, in order to replace certain of the components of the housing, it is necessary to either replace the entire housing or cut out the worn parts by using a cutting torch or other cutting implement and then replacing the cut out parts with new parts and welding them in place. Both procedures are quite expensive in that the cost of a new housing is high and the downtime required in cutting out and welding in new parts is also extensive and thus the cost is very high.

Figure 4:
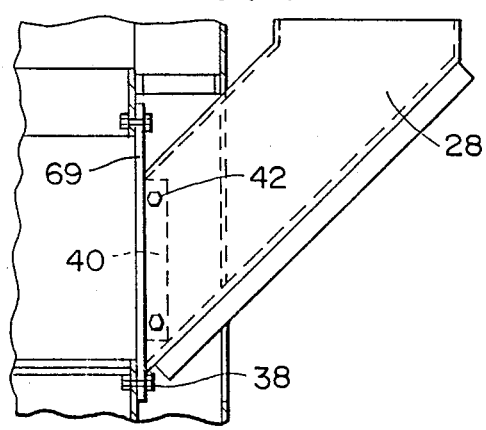
FIG. 4 is a detailed sectional view of the feed chute illustrating the replaceable wear plates and replaceable chute.
Figure 5:
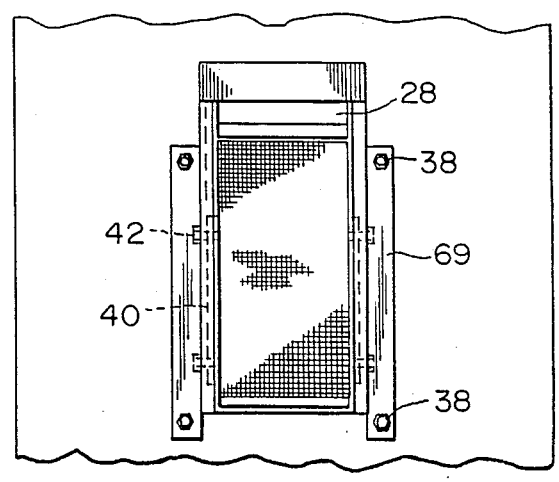
FIG. 5 is an elevational view of the structure of FIG. 4.

In order to reduce the costs and reduce the downtime, replaceable parts are provided. The feed chute 28 is replaceable by virtue of the inner lower end being provided with a flange 69 that is secured to the inner housing by nuts and bolts 38 as illustrated in FIGS. 4 and 5. In addition, a wear plate 40 is fastened to the inner surface of each side wall of the feed chute 28 which is generally rectangular or square in cross sectional configuration with the wear strip or plate 40 being secured in place by a nut and bolt fastener arrangement 42. Thus, with this construction, the feed chute 28 is replaceable and, in addition, the areas of greatest wear, on the side walls of the feed chute, each are provided with a removable wear strip or wear plate 40.

Figure 3:
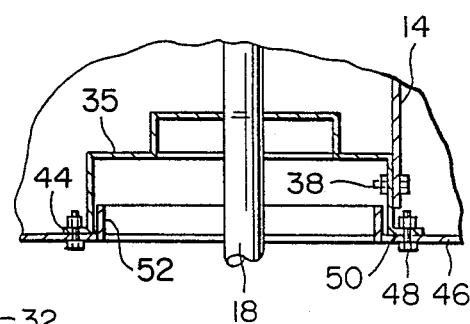
FIG. 3 is a fragmental view of the base section illustrating the replaceable parts.

The removable base section 35 is illustrated in FIG. 3 and includes a cylindrical structure having different diametrical portions in which the lower end is provided with an outturned flange 44 secured to a bottom wall 46 of the housing 12 by nut and bolt fasteners 48 with a gasket being provided between the flange 44 and the bottom wall 46 as indicated by numeral 50. Also, the bottom wall 46 is provided with the inturned flange 52 which is an existing component of centrifugal pellet dryers. The feed chute is attached to the base section as illustrated in FIG. 3 with the lower flange portion of the feed chute being connected thereto by the nut and bolt fasteners 38.

The upper end of the housing 12 includes a flange 54 which is oriented just above the discharge chute 24. A top section in the form of a plate 56 rests on the flange 54 with a gasket 58 positioned therebetween and nut and bolt fasteners 60 secure the plate 56 to the flange 54 and also secures a top frame 62 thereto on which the air heater can be positioned and which also includes a bearing support 64 for the upper end of the shaft 8. The top plate 56 includes a depending cylindrical flange 66 having a pellet discharge chute 68 extending tangentially and downwardly inclined therefrom with the end of the pellet discharge chute being received interiorly of the chute 24 and forming a replaceable wear part for the upper end of the dryer housing and the discharge chute 24. Removal of the bolts 60 enables the plate 56, flange 66 and pellet discharge chute 68 to be easily removed and replaced.

When the pellet dryer is used to dry plastic and/or rubber pellets, the pellets are usually mixed with water in a slurry and enter the lower portion of the dryer through the inlet 26. A major portion of the water is discharged through the bottom screen 30 on the feed chute 28. The remaining water and pellets enter the lower portion of the dryer and are picked up by the spinning rotor or drum 16 with the spirally arranged blades serving to move the pellets upwardly between the spinning rotor and the stationary inner housing 14 which may be in the form of a perforated member or screen. Through conventional mechanical action and centrifugal force, the pellets are carried upward in a spiral path and they ricochet back and forth between the rotor blades and screens with all water draining downwardly and upwardly and ultimately out of the water discharge 34 since the water passes through the screens and exits at the base of the dryer into a suitable drain. The dry pellets are then discharged tangentially at the upper end of the dryer through the pellet outlet nozzle or chute 24. Problems occur when the pellets contain abrasive fillers and thus become abrasive pellets. Examples of abrasive fillers include fiberglass, talc, titanium dioxide and the like. When drying such pellets, the dryer will experience rapid erosion and abrasion of the parts which are contacted by the pellets. Inasmuch as these parts are actually an integral part of the housing or welded thereto, it is quite difficult and time consuming to replace the worn parts. Present day practice involves either the replacement of the entire dryer housing or feed chute or burn out or cut off or cut out the worn parts and weld in new parts. This solution is very expensive not only from the standpoint of the cost of a new housing or feed chute but also costs to the customer in downtime of the dryer.

As a result of these problems, the present invention has been developed to provide a solution to the specific abrasion problem in the areas of the feed chute, the base section and the top section and pellet discharge chute. The feed chute problem has been solved by installing two replaceable wear plates on each internal side of the feed chute where abrasion occurs which will be attached by nuts and bolts and the entire feed chute can also be replaced by the flanged connection and the nuts and bolts holding the flanged connection to the inner housing. The base section problem has been solved by providing the area of the base section that is subject to wear as a separate assembly 35 that is attached by nuts and bolts 44. The top section and pellet discharge chute problem has been solved by providing a separate assembly in the form of a plate 56, cylindrical flange 66 and chute 68 that is incorporated into the housing by a flange connection secured by nuts and bolts with a gasket being provided to maintain the waterproof integrity of the outer housing 12.

With these solutions, the customer using a centrifugal pellet dryer will be able to dry abrasive pellets while limiting or substantially reducing the amount of downtime between necessary repairs. By maintaining a supply of replacement wear parts, the customer using the pellet dryer with replaceable parts can materially reduce downtime and render the operation more cost effective.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a centrifugal pellet dryer including an outer housing, a rotatable drum with spiral blades mounted exteriorly thereof and an inner housing of foraminous material enclosing the rotatable drum, said drum and inner housing being mounted within said outer housing, a feed chute for a slurry of water and pellets at the lower end of the outer housing for feeding pellets between the drum and foraminous inner housing, a discharge chute at the upper end of the outer housing communicating with the space between the rotatable drum and foraminous inner housing for discharge of dry pellets, said feed chute being downwardly inclined and including a foraminous inclined bottom wall and a pair of vertical side walls perpendicular to the bottom wall with the side walls being subject to erosion by movement of abrasive pellets down the feed chute, a narrow wear strip mounted vertically on the inner surface of each side wall of the feed chute adjacent the lower end thereof and means removably securing the wear strips on the side walls of the feed chute to prevent erosion of the side walls of the feed chute and enable replacement of the wear strips when they become worn, said discharge chute including a liner completely covering the interior surface of said discharge chute to protect the discharge chute from erosion when dried abrasive pellets are discharged from the discharge chute, means removably mounting said liner in operative position, said outer housing including a base section positioned to be impinged by pellets discharged from the feed chute to protect the outer housing from erosion by abrasive pellets, means removably securing said base section in operative position, on the bottom end portion of the outer housing to enable replacement thereof.

2. The structure as defined in claim 1 wherein said means removably mounting said liner includes a plate on the upper end of the outer housing, means detachably securing the plate to said outer housing, a depending peripheral flange on said plate for receiving dried pellets from said drum and inner housing, said liner including a tubular member connected tangentially to said flange and extending into the discharge chute in close association with the interior thereof, said feed chute including a vertical peripheral flange at the lower end thereof engaged with the periphery of an inlet opening in the outer housing and means detachably connecting said vertical flange to said outer housing to enable replacement of the feed chute.

* * * * *